Feb. 17, 1953  T. H. WILSON ET AL  2,628,599
PERCUSSIVE TOOL
Filed April 7, 1950
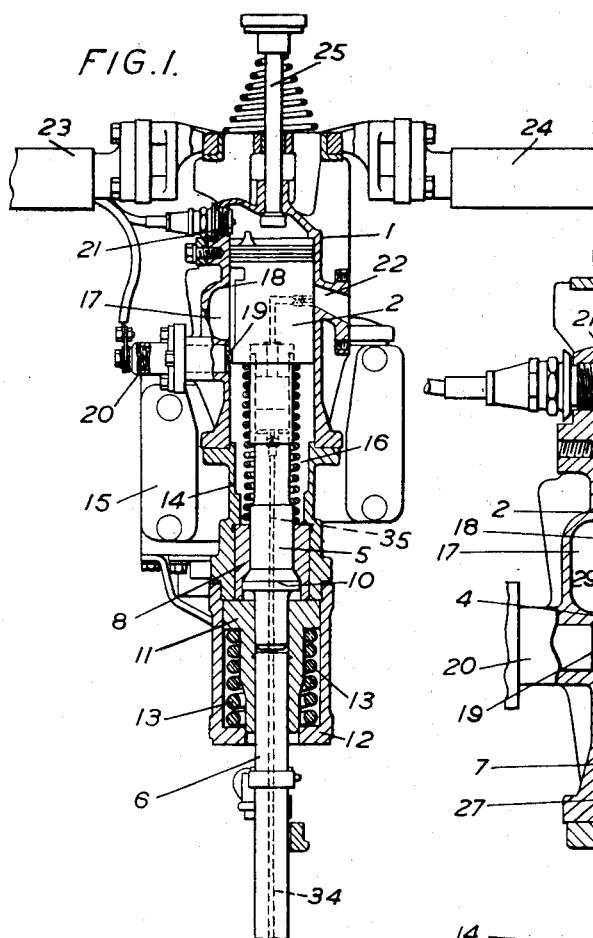
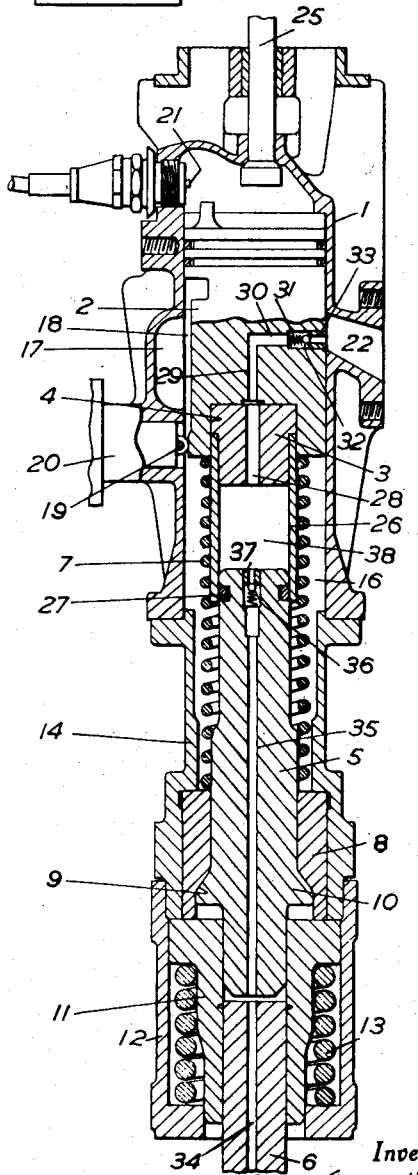
Inventors
Thomas H. Wilson
Ronald H. Richardson
By Patented Feb. 17, 1953

2,628,599

UNITED STATES PATENT OFFICE 2,628,599

PERCUSSIVE TOOL

Thomas Harold Wilson and Ronald Herbert Richardson, Coalville, England, assignors to Francis N. Bard, Chicago, Ill.

Application April 7, 1950, Serial No. 154,458
In Great Britain August 26, 1949

7 Claims. (Cl. 123—7)

This invention relates to percussive tools of the type employed for the purpose of penetrating concrete, roads, rock, stone and like artificial and natural substances and is applicable to power driven breakers, hammers, rippers and drills generally, for instance those which are driven on the internal combustion principle, electrically and by fluid pressure.

The invention has reference to power driven tools of the type aforesaid which include in their constructions barrels, cylinders or like casings with anvils or other internal members for transmitting blows, engendered by the power driving means in an operating member, to the working drill or bit.

Moreover, the invention is intended for application primarily, though not exclusively, to hand supported and hand guided tools of the type concerned.

In the formation of holes or bores in substances of the character aforesaid the hole or bore formed is of a diameter only slightly larger than that of the drill or bit. As a result, the drill or bit cannot clear itself of the chippings and dust produced during the formation of the hole or bore, and becomes clogged. It is the object of the present invention to provide means for automatic and continuous clearing of the hole or bore so that one of a substantial depth may be formed without requiring withdrawal of the drill or bit and subsequent removal of the chippings and dust.

In accordance with the present invention the relative movement between the operating member and the anvil or the like is utilized, in the working of the tool, to produce a flow of air which is directed to the working zone with the object of removing chippings and dust therefrom.

Conveniently one or more air passages is or are formed through the anvil or the like and in the drill or bit, and the movement of the power driven operating member is employed to cause the creation of an air pressure, such that air is forced through the air passage or passages to blow chippings and dust from the working zone of the tool.

Preferably the arrangement incorporates the features that at least one air passage is formed in the anvil from end to end thereof, that the drill or bit has a corresponding passage leading to the working part of this drill or bit, and that an air compression chamber is furnished in the tool, this chamber being defined by the anvil or the like, the operating member, and a part or parts associated therewith and being arranged to deliver compressed air to the aforesaid passages.

Valve means are provided for controlling the flow of air from the chamber into said passages.

The aforementioned air compression chamber is advantageously defined by a cylindrical sleeve secured to and surrounding a striker pin on the said operating member, this pin itself and the upper end of the anvil or the like—which is slidably received by said sleeve-forming end walls of the chamber.

The invention is applicable with advantage to internal combustion tools of the kind concerned wherein there is a free piston which is adapted under the explosive force of the ignited fuel to strike the anvil or other internal member which in turn transmits the blows to the drill or bit. In such a tool there may be an internal combustion engine in which, in effect, the cylinder head is constituted by the free piston. Alternatively there may be a pre-compression chamber into which the fuel charge is driven, compressed, and delivered into a combustion space for ignition.

In the following further description the invention will be regarded—without limitation in this respect—as applied to an internal combustion tool the general structure of which includes an anvil housing attached to the lower end of the cylinder, such cylinder containing the aforesaid free piston, and the communicating upper and lower parts respectively of the housing and cylinder constitute a pre-compression chamber into which the fuel charge is drawn by the upward movement of the free piston and from which it is delivered under pressure to the combustion space at the top of the cylinder by the downward movement of the free piston. A compression spring re-acts between the lower part of the anvil housing and the under side of the free piston, to assist in returning the latter to the top of the cylinder, and the lower end of such spring surrounds the anvil, whilst the upper end surrounds a striker on the lower end of the free piston.

In order to compensate for the loss of volume in the pre-compression chamber by the placing of the air-compression chamber in it, the anvil housing and its associated parts could be increased in length and/or cross-section.

With such an arrangement, that is with a sleeve fitting over the striker and the anvil, there may be a one-way discharge valve in the end of the anvil, and there may be a one-way inlet valve in the free piston, or in a part moving therewith. When in the piston, such valve could be arranged so as to register with an exhaust port or other convenient opening to atmosphere as the piston reaches the top of its stroke, so that the first part of the upward movement of the piston would create a partial vacuum in the air-compression chamber within the said sleeve, to be relieved by the admission of air when the inlet valve comes opposite the said exhaust port or other opening.

In the annexed drawings,

Figure 1 is an elevational view, partly in vertical cross-section, of an internal combustion hammer provided in accordance with the present invention.

Figure 2 is an enlarged fragmentary vertical section through the same tool.

Referring to the drawings, the tool therein illustrated comprises an internal combustion cylinder 1, in which is mounted for reciprocation an operating member in the form of a free piston 2 having a striker pin 3 secured in a recess 4 in its underside.

The pin 3 co-operates with the upper end face of an anvil 5, being arranged to strike the latter periodically as it carries out its reciprocating strokes, the blow being transmitted to the working bit 6 of the tool. The piston 2 moves downwards in its cylinder against the action of a return compression spring 7 bearing at its upper end against the underside of the piston and at its opposite end against the upper face of a bearing sleeve 8. The latter has a recess 9 in which moves a collar 10 integral with the anvil 5. The shoulder of this collar 10 is arranged to engage with the tapered bottom of the recess 9 when the anvil is in its uppermost position whilst, when the anvil moves down, the front face of this collar abuts against a follower 11. The latter is urged upwards in a ferrule 12 by a spring 13, this ferrule being connected to an anvil housing 14 which in turn is connected to the lower end of cylinder 1.

In the hammer illustrated there is provision for precompression of the fuel. Hence, a fuel supply unit 15, represented as a jacket around the tool body, is used to feed a mixture of air and fuel to the space 16 beneath piston 2. This mixture is compressed during the downward stroke of the piston and the pre-compressed charge so obtained is transferred via a passage 17 to the upper side of the piston for final compression by the upward return movement of the piston under the compulsion of spring 7. As will be observed, the piston 2 is formed with a longitudinal groove 18 in which moves a projecting element 19 of a switch mechanism 20. When the piston 2 reaches its upper dead centre position, the mechanism 20 operates to cause sparking of plug 21 and driving down of the piston.

The exhaust port from the cylinder is identified at 22, whilst 23 and 24 represent a pair of lateral handles. 25 is a plunger mechanism for starting up the internal combustion engine by initially depressing piston 2 against return spring 7.

Now, in accordance with the present invention, the striker pin 3 carries a skirt 26 in the form of a sleeve which embraces, and is engaged with, a reduced lower portion of the pin. The sleeve in effect represents the walls of an air compression cylinder in which the piston is constituted by the upper end of the anvil 5 slidably received by the sleeve 26. It will be noted that the length of sleeve 26 beneath the piston 2 is greater than the maximum distance between the piston and the upper end of anvil 5, wherefore the latter is always embraced by the sleeve. A packing ring 27 is arranged in a square-section annular groove around the anvil 5 adjacent the upper end of the latter.

The striker pin 3 has an axial passage 28 bored therethrough, this being in communication with a drilled passage 29 of small diameter in the piston 2. Passage 29 turns through a right-angle at its upper end to form a widened radial hole 30. This in turn opens out into a recess 31 which accommodates a spring-pressed ball valve 32 bearing against a plug seating 33. The radial hole 30 is so located that its opening will register with exhaust port 22 when the piston 2 is in its upper dead centre position, but will be closed by the wall of the cylinder shortly after the piston 2 has started to move downwards.

The bit 6 is drilled end-to-end with an axial hole 34, as is also anvil 5 at 35, in the latter case the bore being enlarged at the upper end of the anvil to receive a spring pressed ball valve 36 co-operating with a plug seating 37.

Hence, when the tool is working normally, a partial vacuum is created in the space 38 within sleeve 26 as this moves upwards with the free piston 2 and the anvil moves, as it were, relatively downwards. As the piston 2 completes its stroke the inlet valve 31 comes into register with port 22. The latter being connected to atmosphere, the resultant pressure on the ball valve 31 will push it off its seat so that air will flow into space 38. When the piston 2 travels downwards during its working stroke the valve 31 will be closed and the air in space 38 compressed. At a certain stage this air will force valve 36 off its seat and air will be forced down passages 35 and 34 to be blown out of the lower end of the bit.

The quantity of air under pressure passing through the drill or bit at each stroke is comparatively small, but as the machine works at the rate of 1200 to 1500 strokes per minute, this becomes, in effect, a steady stream. The air is discharged close to the cutting edge of the drill or bit and its only means of escape is up the annular space formed between the shank of the drill or bit, and the hole or bore formed by the cutting edges. The velocity of the air through this space is sufficient to carry with it the chips and dust formed by the drill or bit, thus preventing any tendency of the tool to jam in the hole or bore.

What I claim then is:

1. A percussive tool comprising an internal combustion engine cylinder, a piston in said cylinder, said piston having a passage therethrough arranged to communicate with an exhaust port of said cylinder when the piston is in an upper position, an anvil arranged in the path of said piston and having an air passage therethrough, a bored working bit for receiving strokes transmitted by said anvil from said piston, a sleeve secured to said piston and slidably embracing the blow-receiving end of the anvil, said sleeve, anvil end, and the blow delivering part of the piston defining an air compression chamber adapted to communicate with atmosphere through the piston passage and cylinder exhaust port when the piston carries out a return stroke.

2. A percussive tool according to claim 1, further including valve means for controlling the airflow through said piston passages.

3. A percussive tool comprising an internal combustion engine cylinder, a piston in said cylinder, said piston having a passage therethrough arranged to communicate with an exhaust port of said cylinder when the piston is in an upper position, valve means controlling the passage in said piston, spring means for returning said piston after a working stroke thereof, a striker pin secured to said piston, an anvil arranged in the path of said striker pin and having an air passage therethrough, valve means controlling the air passage in said anvil, a bored working bit for receiving strokes transmitted by said anvil from said piston, and a sleeve secured to said piston around said striker pin and slidably embracing the blow-receiving end of the anvil so as to define therewith an air compression chamber adapted to communicate with atmosphere through the piston passage and cylinder exhaust port when the piston carries out a return stroke.

4. In a percussive tool having a piston reciprocable in a cylinder for delivering blows to an anvil and having means for forming a combustible charge, delivering it to a precompression space in the cylinder beneath the piston and then transferring it above the cylinder for combustion, air blowing means comprising: confronting cylindrical portions on the piston and anvil, said portions having diameters equal to each other and less than that of the piston; a sleeve embracing said cylindrical portions and forming therewith an air compression chamber; and valved passageways communicating with said chamber.

5. In a percussive tool having a piston reciprocable in a cylinder for delivering blows to an anvil and having means for forming a combustible charge, delivering it to a precompression space in the cylinder beneath the piston and then transferring it above the cylinder for combustion, air blowing means comprising: confronting cylindrical portions on the piston and anvil, said portions having diameters equal to each other and less than that of the piston; a sleeve embracing said cylindrical portions and forming therewith an air compression chamber, said sleeve having an external diameter substantially less than the internal diameter of the cylinder, where the precompression space is the annular space therebetween; and valved passageways communicating with said chamber.

6. In a percussive tool having a piston reciprocable in a cylinder for delivering blows to an anvil and having means for forming a combustible charge, delivering it to a precompression space in the cylinder beneath the piston and then transferring it above the cylinder for combustion, air blowing means comprising: confronting cylindrical portions on the piston and anvil, said portions having diameters equal to each other and less than that of the piston; a sleeve embracing said cylindrical portions and forming therewith an air compression chamber, said sleeve having an external diameter substantially less than the internal diameter of the cylinder, whereby the precompression space is the annular space therebetween; a spring surrounding said sleeve for returning the piston; and valved passageways communicating with said chamber.

7. Apparatus of the character claimed in claim 6, wherein said passageways are in the piston and anvil.

THOMAS HAROLD WILSON.
RONALD HERBERT RICHARDSON.

REFERENCES CITED

The following references are of record in the file of this patent:

UNITED STATES PATENTS

| Number | Name | Date |
|---|---|---|
| 2,121,706 | Little | June 1, 1938 |
| 2,180,034 | Charles | Nov. 14, 1939 |
| 2,399,458 | Bergman | Apr. 30, 1946 |